United States Patent
Spada

(10) Patent No.: US 11,426,830 B2
(45) Date of Patent: Aug. 30, 2022

(54) TRANSFER MACHINE WITH A ROTARY TABLE

(71) Applicant: MIKRON SA AGNO, Agno (CH)

(72) Inventor: Nicola Spada, Bioggio (ES)

(73) Assignee: MIKRON SA AGNO, Agno (CH)

( * ) Notice: Subject to any disclaimer, the term of this patent is extended or adjusted under 35 U.S.C. 154(b) by 987 days.

(21) Appl. No.: 16/076,154

(22) PCT Filed: Apr. 18, 2016

(86) PCT No.: PCT/IB2016/052199
§ 371 (c)(1),
(2) Date: Aug. 7, 2018

(87) PCT Pub. No.: WO2017/182839
PCT Pub. Date: Oct. 26, 2017

(65) Prior Publication Data
US 2021/0220952 A1    Jul. 22, 2021

(51) Int. Cl.
*B65G 47/84*    (2006.01)
*B23Q 1/52*    (2006.01)
(Continued)

(52) U.S. Cl.
CPC .......... *B23Q 1/527* (2013.01); *B65G 47/847* (2013.01); *B23Q 39/042* (2013.01)

(58) Field of Classification Search
CPC ...... B23Q 1/527; B65G 47/84; B65G 47/842; B65G 47/847
(Continued)

(56) References Cited

U.S. PATENT DOCUMENTS

| 4,651,879 A | * | 3/1987 | Harris | ................... B07C 5/362 |
| | | | | 209/523 |
| 5,113,996 A | * | 5/1992 | Francioni | ............. B65G 47/846 |
| | | | | 198/723 |

(Continued)

FOREIGN PATENT DOCUMENTS

| CN | 102844160 A | 12/2012 |
| CN | 105081890 A | 11/2015 |

(Continued)

OTHER PUBLICATIONS

International Search Report dated Jan. 18, 2017 re: Application No. PCT/IB2016/052199, pp. 1-4, citing: EP 0 937 539 A1, DE 101 36 778 A1, DE 199 13 721 A1, EP 0 785 040 A1, DE 196 42 975 A1 and WO 2011/124966 A2.

(Continued)

*Primary Examiner* — Douglas A Hess
(74) *Attorney, Agent, or Firm* — Cantor Colburn LLP

(57) ABSTRACT

A transfer machine for machining operations includes a frame, a rotary table with a rotary feeding movement relative to a machine axis, a plurality of workpiece-holder members associated with the rotary table and spaced by a working radius (r) from the machine axis, and a plurality of workstations accessible by the workpiece-holder members as a result of the feeding movement of the table. The transfer machine further includes at least one rotary unit able to rotate a workpiece-holder member about a respective axis and relative to the table, wherein the rotary unit includes a motor assembly located in the machine base at a distance (d) from the machine axis which is less than the working radius (r).

13 Claims, 3 Drawing Sheets

(51) Int. Cl.
*B65G 47/86* (2006.01)
*B23Q 39/04* (2006.01)

(58) Field of Classification Search
USPC ........... 414/744.1; 198/470.1, 478.1, 867.11, 198/867.12, 867.14
See application file for complete search history.

(56) References Cited

U.S. PATENT DOCUMENTS

| | | | | |
|---|---|---|---|---|
| 6,311,824 | B1 * | 11/2001 | Van Pul | B65G 47/848 198/374 |
| 7,823,717 | B2 * | 11/2010 | Zanini | B67C 7/0053 198/470.1 |
| 8,955,665 | B2 * | 2/2015 | Kramer | B65C 9/04 198/377.01 |
| 9,598,198 | B2 * | 3/2017 | Gertlowski | G01D 5/244 |
| 10,173,323 | B2 * | 1/2019 | Carlisle | B25J 19/063 |
| 10,399,795 | B1 * | 9/2019 | Jang | B65G 47/846 |
| 11,046,566 | B2 * | 6/2021 | Seewald-Raider | B67C 7/004 |

FOREIGN PATENT DOCUMENTS

| | | |
|---|---|---|
| DE | 19642975 A1 | 11/1997 |
| DE | 19913721 A1 | 10/2000 |
| DE | 10136778 A1 | 7/2003 |
| EP | 0785040 A1 | 7/1997 |
| EP | 0937539 A1 | 8/1999 |
| WO | 2011124966 A2 | 10/2011 |

OTHER PUBLICATIONS

Written Opinion dated Jan. 18, 2017 re: Application No. PCT/IB2016/052199, pp. 1-4, citing: EP 0 937 539 A1, DE 101 36 778 A1, DE 199 13 721 A1, EP 0 785 040 A1, DE 196 42 975 A1 and WO 2011/124966 A2.

\* cited by examiner

TRANSFER MACHINE WITH A ROTARY TABLE

TECHNICAL FIELD

The disclosure relates to the field of transfer machines with a rotary table for performing machining operations.

BACKGROUND

The transfer machine is a known type of machine for performing machining operations with a high degree of automation and high productivity.

A transfer machine comprises essentially a plurality of workstations distributed around a rotating member, generally called a table or carousel, provided with a plurality of workpiece-holder members, for example workpiece grippers.

Each workstation comprises one or more operating units designed to carry out one or more steps of a predetermined machining cycle, for example a drilling operation, a turning operation, etc. Said operating units typically comprise a tool-holder spindle.

The rotary table provides feeding of the workpieces through the various stations. For this purpose, the table has an indexed rotational movement resulting in each workpiece gripper accessing a respective workstation for each feeding step. The workpiece grippers travel basically along a circular path and access the workstations which are distributed along said circular path. The axis of rotation of the rotary table may be referred to as "machine axis".

In this way the transfer machine is able to perform a plurality of machining steps simultaneously and, in particular, each feeding movement (indexed rotation) of the table corresponds on the one hand to loading of a new workpiece, and on the other hand to expulsion of a finished workpiece which has completed the cycle. In some cases the number of workpiece-holder members and workstations is a multiple of the steps of the machining cycle, which means the machine is able to complete two or more machining cycles for each full rotation of the table.

It can be appreciated that transfer machines are particularly suitable for mass production since they eliminate the downtime between the machining steps, they perform a highly automated cycle and reduce significantly the manufacturing costs. At the same time, each workstation may be configured to carry out precision-machining operations. These features have determined the success of transfer machines especially for the making of mass-production mechanical components which require complex and/or high-precision machining, such as components for the automotive industry, components for hydraulic and pneumatic systems and the watch-making industry, small precision metal components, etc.

The transfer machines of the known type, however, have a drawback which has not yet been solved. One or more machining steps often require a rotation of the workpiece gripper about a respective axis. This rotation is obviously required for machining operations which necessitate a rotational movement of the workpiece, such as turning; however it may be required to rotate the workpiece even in the case of static machining (for example drilling), in order to properly position the workpiece relative to the tool. In all these cases it is required to provide a suitable rotary unit for rotation of the workpiece gripper and, therefore, a transfer machine is normally provided with a certain number of these rotary units.

A rotary unit comprises a motor and, if necessary, a reduction gear. In the art said motor assembly or gearmotor is positioned directly on the working circumference so as to be substantially aligned with the axis of the workpiece gripper. For example, in a transfer machine with vertical axis and horizontal table, the motor unit is located directly above or below the workpiece gripper.

In this way, however, the rotary unit takes away some room for the operating units (spindles) and limits the access to the workpiece. For example, assembly of a rotary unit below the rotating table allows machining only on the top part of the workpiece, and vice versa.

More generally the rotary unit, and in particular the respective motor assembly, which is relatively large, interferes with positioning of the machining units relative to the workpiece and, consequently, some machining operations become difficult or impractical due to the presence of the motor assembly.

Another problem is that the rotary unit is quite close to the tool working zone which can be regarded as a relatively critical zone of the machine due to the production of chips and/or the possible use of lubricants or coolants.

The above affects the productivity of the machine, for example it may happen that a machining operation, which could be completed theoretically in a single station, is to be performed in two or more successive stations.

The flexibility of the machine is also adversely affected because different machining cycles may have a different sequence of machining operations with the need for rotation and/or angular positioning of the workpiece and, consequently, the change-over from one machining cycle to another may require a certain amount of time for reconfiguration of the transfer machine, for example in order to install a certain number of rotary units where necessary.

SUMMARY

The disclosure overcomes the limitations and drawbacks which have been mentioned above. In particular, the disclosure improves the productivity and the operational flexibility of transfer machines.

The idea forming the basis of the disclosure is to locate the rotary units inside the machine, within the respective base, rather than arrange them on the working radius, thus freeing the machining zones.

Accordingly, the advantages are achieved by providing a transfer machine for performing machining operations comprising:

a support frame;
a rotary table with a rotary feeding movement relative to a machine axis;
a plurality of workpiece-holder members mounted on said rotary table and distanced by a predefined working radius from said machine axis,
a plurality of workstations accessible by said workpiece-holder members as a result of the rotary feeding movement of said table; and
at least one rotary unit able to rotate a workpiece-holder member relative to a respective axis;
wherein said rotary unit comprises a motor assembly located at a distance from said machine axis which is smaller than said working radius.

Said distance between the motor assembly and the machine axis is defined for example by the distance between said machine axis and an axis of said motor assembly. Said axis of the motor assembly is the axis of rotation of a motor drive shaft and for the sake of brevity will also be called motor axis. In a preferred embodiment said motor axis is parallel to the machine axis.

Each workstation comprises one or more machining units. A machining unit is formed for example by a tool-holder spindle. Advantageously, the distance between the motor assembly and the working radius is such that the machining zone around the workpiece gripper is freely accessible on both sides of the rotating table, for example above and below. In this way, there is greater freedom of positioning of the machining units and various steps may be performed in the same workstation. More particularly, according to one aspect of the disclosure, the rotary unit, and especially the respective motor assembly, is not located within the "span" of the gripping member and within the active range of the machining units, so as not to interfere with the latter.

Preferably said rotary unit also comprises a transmission assembly which is housed in the rotary table, thus being integrated in said table.

Said transmission assembly has a primary axis and a secondary axis. The primary axis of the transmission assembly is to be driven by the motor assembly for example by means of a direct coupling. Advantageously, said primary axis is located relative to the machine axis at the same distance at which the motor assembly is installed. The secondary axis preferably coincides with the axis of rotation of the workpiece-holder member. Both the primary axis and the secondary axis of the transmission assembly are preferably parallel to said machine axis.

Even more preferably, the rotary unit comprises a selective coupling system between the motor assembly and said transmission assembly. The coupling system, in greater detail, may take a first disengaged position or rest position and a second engaged position or working position. In said first position the motor assembly and the transmission assembly are separated and the table is free to rotate; in said second position the motor assembly and the transmission assembly are connected so that a respective drive shaft and a respective driven shaft are rotationally coupled to each other.

In this way the motor assembly may be supported by the frame in a stationary manner while the transmission assembly, which is associated to a respective workpiece-holder member, moves together with the rotary table being housed within the table itself. The motor assembly in particular is mounted in correspondence of a workstation which requires rotation of the workpiece.

When the workpiece-holder member reaches said station, owing to the indexed feeding movement of the rotary table, the transmission assembly (which is integrated in the rotary table) and the motor assembly (which stationary, being fixed to the frame) are located in a position which allows their mutual engagement, for example they are axially aligned. In said position the selective coupling system may be activated, passing from the first (rest) position to the second (working) position. When the coupling system is engaged, the motor assembly may impart to the workpiece-holder member a desired rotation which may serve to position the workpiece for the required machining operation, or may form an integral part of the machining operation, for example spinning of the workpiece for turning.

The actual number of rotary units may vary depending on the requirements. In a preferred embodiment of the disclosure a respective rotary unit is provided for each of the workpiece-holder members. In this way each workpiece-holder member can be rotated in each workstation of the machine. The table may comprise a plurality of transmission assemblies for respective workpiece-holder members and advantageously comprises one transmission assembly for each of the workpiece-holder members.

The location of the motor assemblies of the rotary units in the base of the machine and within the working radius, instead of being on the radius, may be termed "inboard" location, since it remains inside the working radius. This approach of the disclosure is contrary to the prior art teaching of arranging the rotary units, where necessary, on the working radius of the machine i.e. on the periphery of the rotary table.

The big advantage of the disclosure is freeing the space around the rotary table, for example above and below said table, to be fully available for the machining units. The motor assembly is in fact displaced inside the machine, within the base or frame, while the respective transmission assembly is substantially integrated in the rotary table.

Consequently, the efficiency and the productivity of the machine are greatly improved. For example, i a given workstation can perform different machining steps with respective machining units situated both above and below the rotary table, without any interference between the machining units and the unit for performing rotation of the workpiece. Moreover, one has the greatest freedom of positioning of the machining units around the workpiece, without being restricted by the encumbrance of the rotary unit and in particular of the motor.

A further advantage is that the motor is positioned at a point of the machine which is more protected from the machining zone and is not directly exposed to the cutting zone and to the production of machining chips.

The disclosure allow to reduce the unitary cost of the products, compared to the prior art, thus further broadening the potential application range of transfer machines.

The disclosure also relates to a transfer machine according to the accompanying claims, in which the rotary table comprises at least one rotating workpiece-holder member and a respective transmission assembly between said rotating workpiece-holder member and an operating axis, said operating axis being located at a distance from said machine axis which is smaller than said working radius, and wherein the frame comprises an arrangement for the installation of at least one motor assembly engageable with said transmission assembly. Preferably, said arrangement comprises a seat for mounting a motor assembly with a motor axis parallel to said operating axis so that, in a working position, said motor axis is aligned with said operating axis, and the motor assembly is engageable with said transmission assembly.

The advantages of the disclosure will emerge more clearly with the aid of the following description which relates to a preferred embodiment, illustrated by way of a non-limiting example.

DETAILED DESCRIPTION OF THE FIGURES

Figure 1:
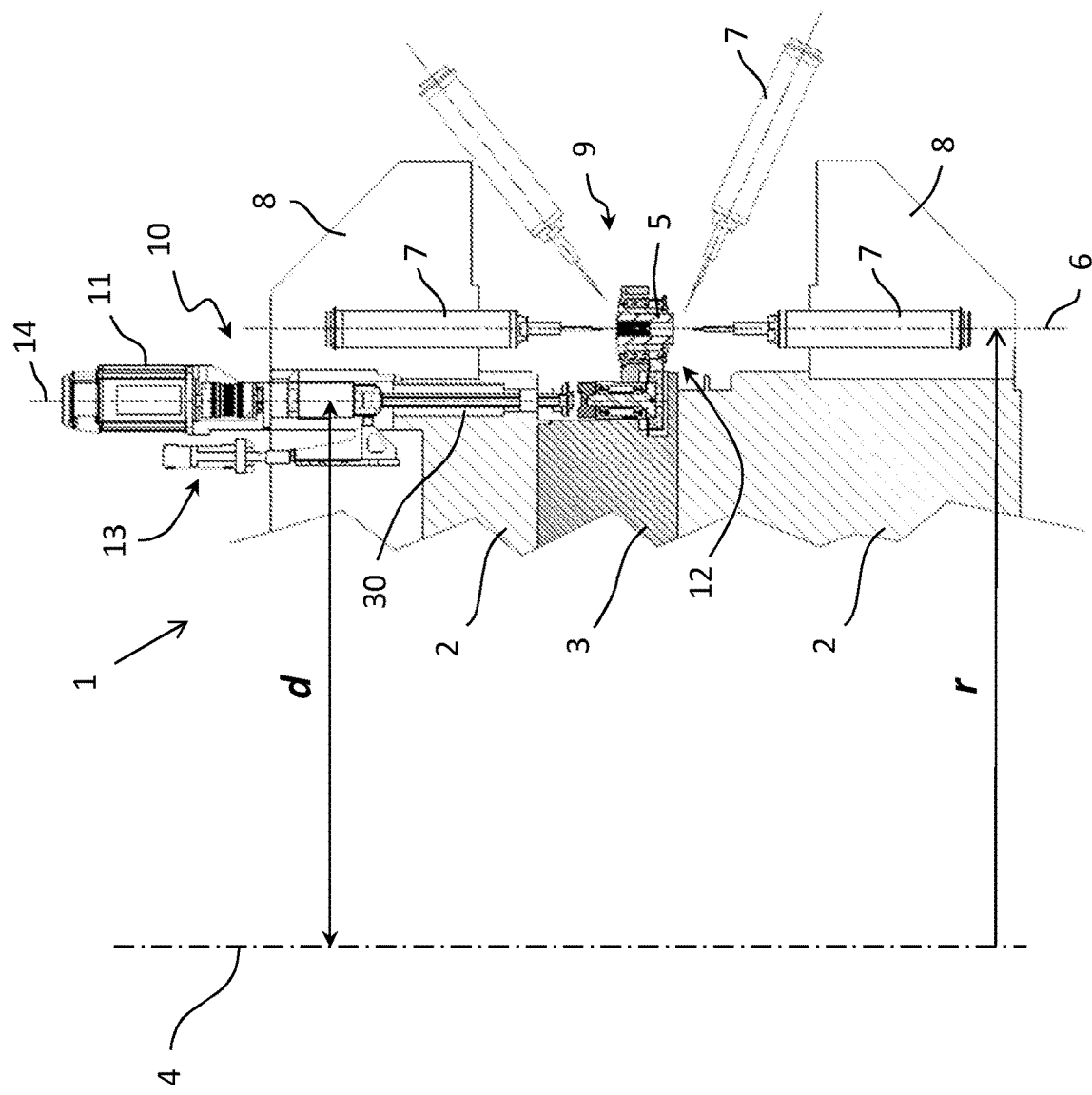
FIG. 1 is a simplified scheme of a transfer machine according to a preferred embodiment of the disclosure.
Figure 2:
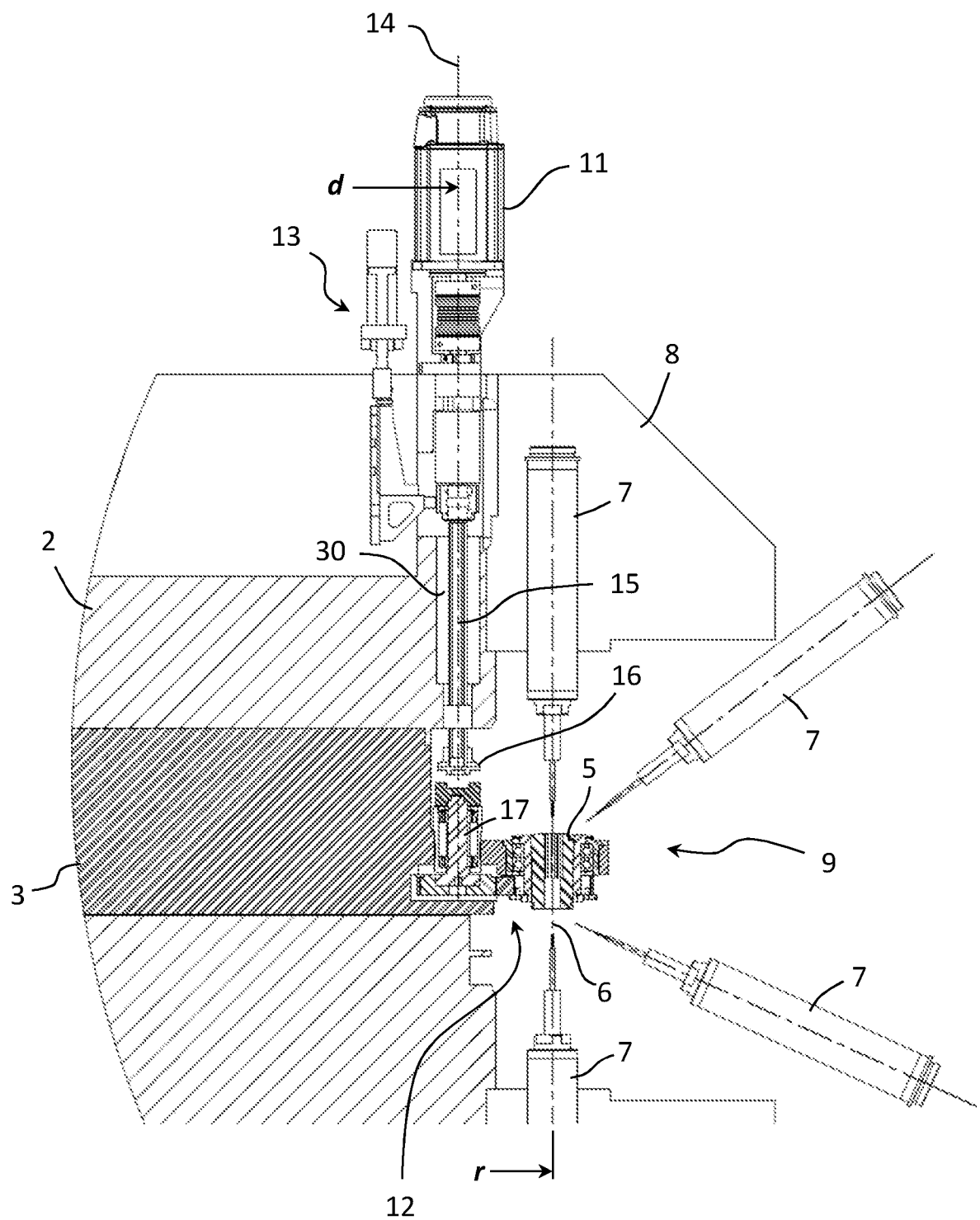
FIG. 2 is a cross-sectional view of a part of the machine of FIG. 1.
Figure 3:
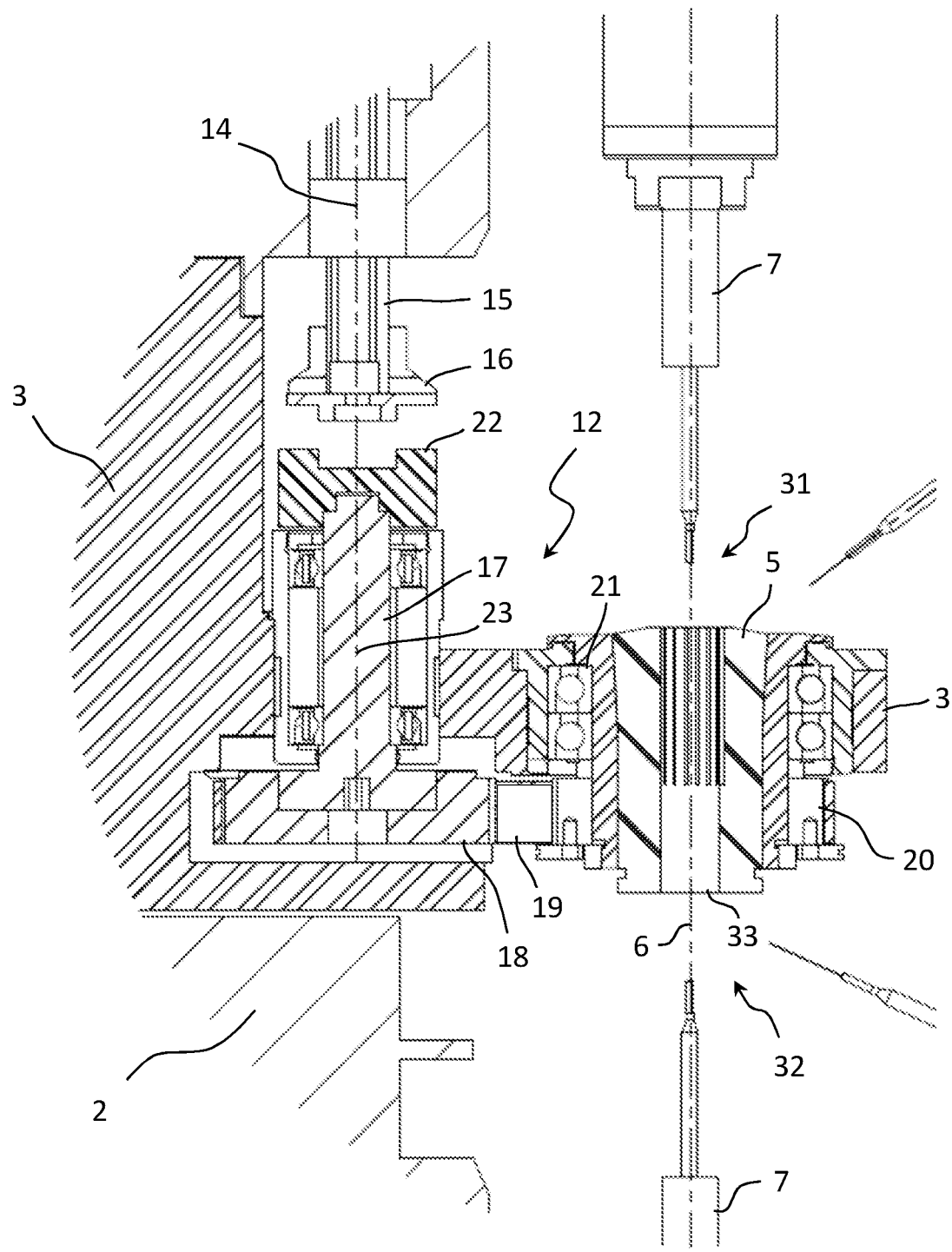
FIG. 3 is a detail of FIG. 2.

FIGS. 1-3 show partially a transfer machine 1 comprising: a frame (or base) 2; a table 3 rotating about a vertical machine axis 4; a plurality of workpiece grippers 5 associated with said rotary table 3.

Each workpiece gripper 5 has a gripper axis 6 which is distanced by a working radius r from said machine axis 4. In other words the grippers 5 are distributed over said working radius r. Each gripper 5 is also rotatably associated with the table 3, being able to rotate about its axis 6. For example the grippers are mounted on bearings, as will be explained more clearly below.

The example of the figures refers to a machine 4 with a vertical axis and horizontal table 3, but this feature is not limiting for the purpose of the disclosure. In the example the axes 6 of the grippers are also vertical and consequently parallel to the machine axis 4.

The machine has a system for the feeding movement of the rotary table 3 which is able to impart to said table 3 an indexed rotation. This feeding system is realized using a known technique in the field of transfer machines and need not be described in detail; for example the feeding system may comprise front gear rings known as Hirth rings.

The machine 1 comprises a plurality of operating units which in this example are formed by tool-holder spindles 7. Said spindles 7 are firmly connected to the frame 2, for example by means of top and bottom supports 8.

The spindles 7 define a plurality of workstations 9 located around the rotary table 3 and designed for operation on workpieces held by the grippers 5 which, as a result of the feeding movement of the table 3, travel arc-shaped paths of radius r.

One or more spindles 7 act in each of said workstations 9. As shown by way of example in the figures, the spindles 7 may be positioned so as to machine the part of the workpiece which is located on either side of the rotary table 3 (in the example above or below the table 3).

The machine comprises one or more rotary units 10 which serve to rotate the gripper 5 (and then the workpiece) about the gripper axis 6, at one or more of the workstations 9, depending on the required production cycle.

A rotary unit 10 comprises essentially a motor assembly 11, a transmission assembly 12 and a coupling member 13.

The motor assembly 11 is mounted inside a corresponding seat 30 of the frame or base 2 and is located inside the working radius r so as not to occupy space in the zones above and below the table 3 which, consequently, are freely accessible by tools mounted on the spindles 7.

The motor assembly 11, in greater detail, has a motor axis 14 which is parallel to the machine axis 4 and which is located at a distance d from said machine axis 4, said distance d being smaller than the working radius r. Consequently, the motor assembly 11 is housed in the machine base within the working circumference of the machine, which is defined by the working radius r and along which the stations 9 are arranged.

In greater detail, the motor assembly 11 comprises a drive shaft 15 which lies on said motor axis 14 and terminates in a flange 16 (FIG. 2).

The transmission assembly 12 is integrated in the rotary table 3 and comprises essentially (FIG. 3) a secondary shaft 17 which drives the workpiece gripper 5 by means of a belt transmission comprising a pulley 18 connected to the shaft 17, a belt 19 and a pulley 20 connected to the gripper 5. The gripper 5 rotates about the axis 6 via bearings 21.

The secondary shaft 17 has an interface flange 22 suitable for engagement with the already-mentioned flange 16 of the drive shaft 15. The two flanges 16 and 22 are engaged together in a rotationally rigid manner so as to transmit a torque from the drive shaft 15 to the secondary shaft 17.

The secondary shaft 17 and the pulley 18 rotate with respect to an axis 23. The transmission assembly 12 basically transfers the rotary movement from the axis 23, which may be called "operating axis", to the rotation axis 6 of the workpiece-holder member 5.

The coupling member 13 is able to engage selectively the motor shaft 15 with the secondary shaft 17, when the two shafts are in the aligned condition along the motor axis 14, i.e. when the operating axis 23 is aligned with the motor axis 14. Engagement is effected with an axial movement bringing the flange 16 into engagement with the underlying flange 22.

It can be understood, looking for example at FIG. 2, that when the motor assembly 11 and the transmission assembly 12 are disengaged the rotary table 3 can freely move; when the two assemblies 11 and 12 are engaged (i.e. the drive shaft 15 is connected to the secondary shaft 17), the rotary unit 10 may operate by rotating the gripper 5 and the workpiece at a given workstation 9.

The machine 1 may be configured so as to provide a motor assembly 11 only for some of the stations 9, depending on needs. If appropriate, instead, a motor assembly 11 may be installed for each workstation 9.

It should be noted that in the embodiment shown the motor assemblies 11 are positioned at the top of the machine 1, but an embodiment is also possible where some (or all) of the motor assemblies 11 are positioned in the bottom part of the machine.

During use, a workpiece is clamped for example in a seat 33 of the workpiece grippers 5 (FIG. 3). The rotary table 3 moves in an indexed manner transporting each gripper 5 and the associated workpiece, in sequence, through the workstations 9 depending on the programmed machining cycle. The grippers 5 travel along an arc-shaped path with a working radius r, from a workpiece loading station at the start of the machining cycle, to an end-of-machining station where the workpiece is ejected. By operating the engaging member 13, a workpiece gripper 5 which is situated in a predefined station 9 may be operationally connected to a respective motor assembly 11 and, by means of it, may be oriented angularly or made to spin.

The figures show that the machining zones 31, 32 respectively above and below the rotary table 3 (FIG. 3) are freely accessible by the spindles 7 (and the respective tools) owing to the internal positioning of the motor assemblies 11.

The disclosure in fact displaces towards the inside of the machine the size of the motor assemblies 11, transferring the movement to the workpiece grippers 5 via the transmission system 12 which is completely integrated in the rotary table 3 and therefore does not disturb the machining operations. Several spindles 7, or other machining units, may be arranged in the workstations 9 having no longer the encumbrance of the motor assemblies 11. The disclosure thus achieves the aforementioned objects, ensuring greater productivity and flexibility of the machine.

The invention claimed is:

1. A transfer machine for machining operations, comprising:
   a frame;
   a rotary table with a rotary feeding movement relative to a machine axis;
   a plurality of workpiece-holder members mounted on said rotary table and spaced by a predefined working radius (r) from said machine axis,
   a plurality of workstations accessible by said workpiece-holder members as a result of the rotary feeding movement of said table;
   at least one rotary unit able to rotate a workpiece-holder member around a respective axis and relative to the table, said rotary unit comprising:

a motor assembly mounted inside a corresponding seat of the frame and located at a distance (d) from said machine axis which is less than said working radius (r) and a transmission assembly for transferring the rotary movement from said motor assembly to said workpiece-holder member;

wherein the transfer machine further comprises a selective coupling system, between the motor assembly and the transmission assembly, configurable in a first disengaged position, in which the motor assembly and the transmission assembly are separated and the rotary table is free to rotate, and in a second engaged position, in which the motor assembly and the transmission assembly are connected so as to be rotationally coupled to each other and said transmission assembly is integrated in the rotary table.

2. The transfer machine according to claim 1, wherein said distance between motor assembly and machine axis is defined by the distance (d) between an axis of the motor assembly and said machine axis.

3. The transfer machine according to claim 2, wherein said axis of the motor assembly is parallel to the machine axis.

4. The transfer machine according to claim 1, wherein said distance (d) between the motor assembly and the machine axis is such that a machining zone around the workpiece-holder member is freely accessible on both sides of the rotary table.

5. The transfer machine according to claim 1, wherein said transmission assembly connects an operating axis inside the working radius with said respective axis of rotation of a respective workpiece-holder member.

6. The transfer machine according to claim 5, wherein said operating axis coincides with the axis of the motor unit.

7. The transfer machine according to claim 1, wherein said transmission assembly is of a belt or a gear.

8. The transfer machine according to claim 1, wherein the motor assembly comprises a shaft ending with a first flange; the transmission assembly comprises a second flange of interface suitable to a rotationally rigid engagement with said first flange (16), and the selective coupling system is configured to engage or disengage from each other said first flange and second flange.

9. The transfer machine according to claim 1, comprising a plurality of rotary units and preferably a respective rotary unit for each workpiece-holder member.

10. The transfer machine according to claim 1, wherein the workpiece-holder members are formed by grippers.

11. A transfer machine for machining operations comprising:

a frame;

a rotary table with a rotary feeding movement relative to a machine axis;

a plurality of workpiece-holder members mounted on said rotary table and spaced by a predefined working radius (r) from said machine axis, a plurality of workstations accessible by said workpiece-holder members as a result of the rotary feeding movement of said table;

said rotary table comprises at least one rotating workpiece-holder member and a respective transmission assembly between said rotating workpiece-holder member and an operating axis, said operating axis being located at a distance (d) from said machine axis which is less than said working radius; and wherein the transfer machine further comprises a selective coupling system, between a motor assembly and the transmission assembly, configurable in a first disengaged position wherein the motor assembly and the transmission assembly are separated and the rotary table is free to rotate, and in a second engaged position wherein the motor assembly and the transmission assembly are connected so as to be rotationally coupled to each other;

and in that said transmission assembly is integrated in the rotary table; and said frame comprising an arrangement for installation of at least one motor assembly which is engageable with said transmission assembly.

12. The transfer machine according to claim 11, wherein said arrangement comprises a seat for mounting a motor assembly with a motor axis parallel to said operating axis so that, in a working position, said motor axis is aligned with said operating axis, and the motor assembly is engageable with said transmission assembly.

13. The transfer machine according to claim 11, wherein the transmission assembly is integrated in the rotary table.

* * * * *